(12) United States Patent
Tohyama et al.

(10) Patent No.: US 11,538,608 B2
(45) Date of Patent: Dec. 27, 2022

(54) WIRE HARNESS

(71) Applicant: YAZAKI CORPORATION, Tokyo (JP)

(72) Inventors: Eiichi Tohyama, Makinohara (JP); Takashi Tsukuda, Makinohara (JP); Kei Shinohara, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 211 days.

(21) Appl. No.: 17/090,613

(22) Filed: Nov. 5, 2020

(65) Prior Publication Data
US 2021/0134494 A1 May 6, 2021

(30) Foreign Application Priority Data
Nov. 6, 2019 (JP) .............................. JP2019-201320

(51) Int. Cl.
| | |
|---|---|
| *H01B 17/30* | (2006.01) |
| *H01B 7/00* | (2006.01) |
| *H01B 7/22* | (2006.01) |
| *H01B 7/285* | (2006.01) |
| *H01B 13/22* | (2006.01) |
| *H01B 13/26* | (2006.01) |
| *H01B 17/58* | (2006.01) |
| *H02G 3/22* | (2006.01) |

(52) U.S. Cl.
CPC ......... *H01B 17/303* (2013.01); *H01B 7/0045* (2013.01); *H01B 7/228* (2013.01); *H01B 7/285* (2013.01); *H01B 13/221* (2013.01); *H01B 13/26* (2013.01); *H01B 17/583* (2013.01); *H02G 3/22* (2013.01)

(58) Field of Classification Search
CPC .......... H01B 7/0045; H01B 7/17; H01B 7/28; H01B 7/282; H01B 7/285; H01B 7/228; H01B 17/303; H01B 13/26; H01B 13/221; B60R 16/0222; B60R 16/0215
See application file for complete search history.

(56) References Cited

U.S. PATENT DOCUMENTS

| | | | |
|---|---|---|---|
| 2016/0189828 A1* | 6/2016 | Oga | .................... B60R 16/0215 174/72 A |
| 2019/0115120 A1* | 4/2019 | Ogue | .................... H01B 7/2825 |
| 2019/0115121 A1* | 4/2019 | Ogue | .................... H01B 7/0045 |

FOREIGN PATENT DOCUMENTS

JP 2019-62738 A 4/2019

* cited by examiner

*Primary Examiner* — Paresh Paghadal
(74) *Attorney, Agent, or Firm* — Kenealy Vaidya LLP (57) ABSTRACT

A wire harness includes an electric wire, a braided conductor covering the electric wire, a grommet having a tubular insertion portion through which the electric wire and the braided conductor are inserted, a water stop sheet sandwiched between an inner peripheral surface of the insertion portion and the braided conductor, and a fixture attached to the insertion portion so as to reduce a diameter of the insertion portion. The water stop sheet includes a base material layer having a plurality of pores communicating with each other in a thickness direction of the water stop sheet and a sealing compound layer laminated on the base material layer. The sealing compound layer is deformed so as to enter gaps between thin conductor wires constituting the braided conductor and the pores of the base material layer.

4 Claims, 5 Drawing Sheets

WIRE HARNESS

CROSS-REFERENCE TO RELATED APPLICATIONS

This application is based on and claims priority under 35 USC 119 from Japanese Patent Application No. 2019-201320 filed on Nov. 6, 2019, the contents of which are incorporated herein by reference.

TECHNICAL FIELD

The present invention relates to a wire harness including an electric wire, a grommet for stopping water, and a water stop sheet for sealing between the electric wire and the grommet.

BACKGROUND ART

In related art, in a wire harness for an automobile, when an electric wire is passed through an opening portion that communicates inside and outside of a vehicle body of the automobile, a space between the opening portion and the electric wire is closed by a grommet made of an elastic material, so that water, foreign matter or the like is prevented from entering the inside of the vehicle body through the opening portion. The grommet generally has a body portion corresponding to the shape of the opening portion to which the attachment is performed, and a tubular insertion portion through which the electric wire is inserted (for example, see Patent Literature 1).

CITATION LIST

Patent Literature

Patent Literature 1: JP-A-2019-062738

In the grommet of related art described above, after the electric wire is passed through the tubular insertion portion, a binding band or the like is wound around an outer peripheral surface of the insertion portion to tighten the insertion portion. As a result, a diameter of the insertion portion is reduced so that an inner peripheral surface of the insertion portion comes into close contact with the electric wire, and the water or the like can be prevented from entering through between the electric wire and the insertion portion. As described above, in the wire harness provided with a grommet, it is desired to improve the water stopping property at the insertion portion of the grommet.

SUMMARY OF INVENTION

An object of the present invention is to provide a wire harness in which water stopping property at an insertion portion of a grommet is improved.

In order to achieve the object, according to the embodiment, a wire harness according to the present invention includes: an electric wire; a braided conductor covering the electric wire; a grommet having a tubular insertion portion through which the electric wire and the braided conductor are inserted; a water stop sheet sandwiched between an inner peripheral surface of the insertion portion and the braided conductor; and a fixture attached to the insertion portion so as to reduce a diameter of the insertion portion. The water stop sheet includes a base material layer having a plurality of pores communicating with each other in a thickness direction of the water stop sheet and a sealing compound layer laminated on the base material layer, and the fixture reduces the diameter of the insertion portion such that the sealing compound layer deforms to enter gaps between thin conductor wires constituting the braided conductor and the pores of the base material layer.

DESCRIPTION OF EMBODIMENTS

Embodiment

Figure 1:
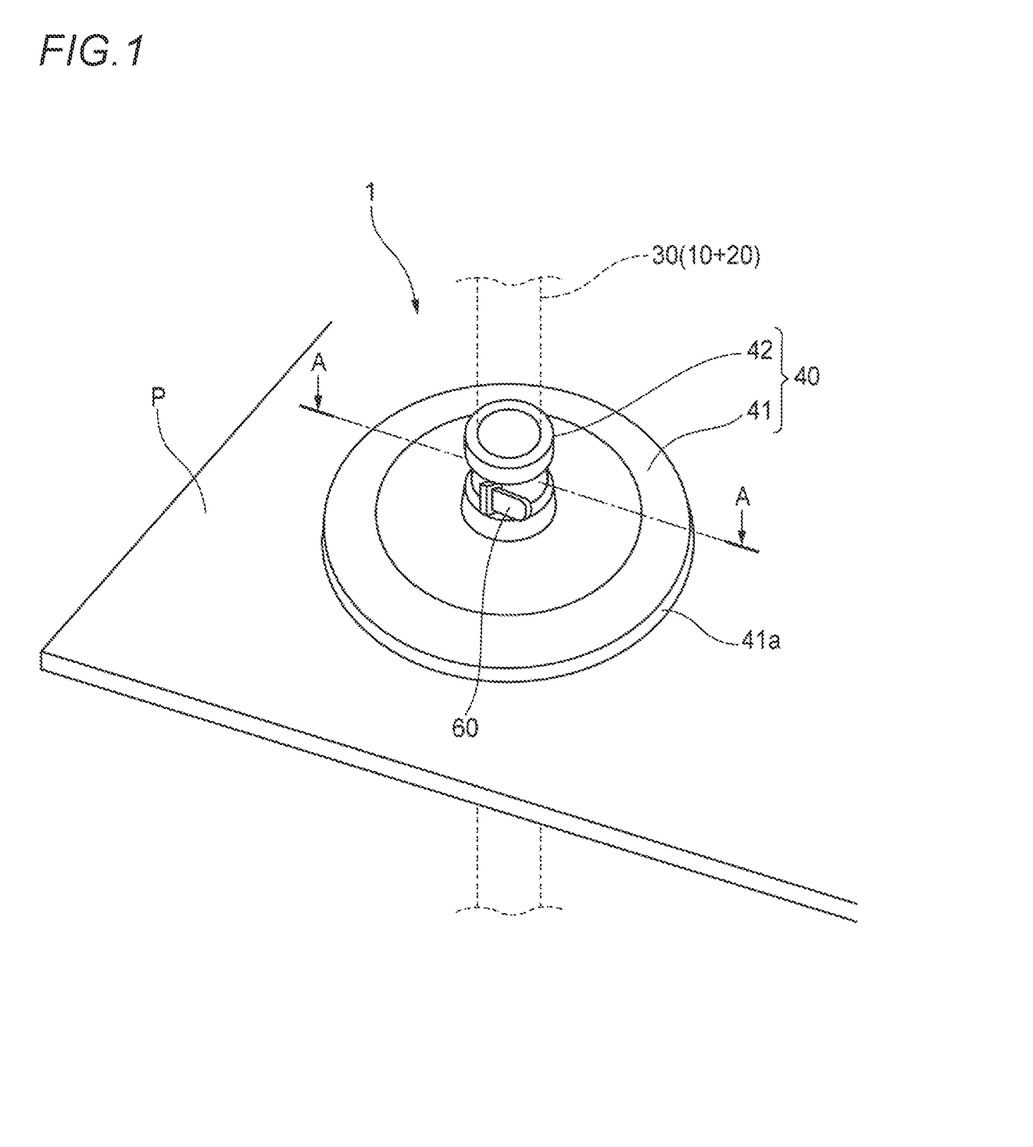
FIG. 1 is a perspective view showing a wire harness according to an embodiment of the present invention in which a sheathless electric wire is inserted through an opening of a panel and a grommet is closed between the opening of the panel and the sheathless electric wire.

Hereinafter, a wire harness 1 according to an embodiment of the present invention will be described with reference to the drawings. Typically, the wire harness 1 is used in a state where a sheathless electric wire 30 is inserted through an opening (not shown) formed in a panel P (for example, a floor wall of a vehicle body) that separates the inside and outside of the vehicle body of an automobile, and a space between the opening of the panel P and the sheathless electric wire 30 is closed by a grommet 40 as shown in FIG. 1.

As shown in FIGS. 1, 2 and FIGS. 4A, 4B, the wire harness 1 includes the sheathless electric wire 30 formed of an electric wire 10 and a braided conductor 20 covering the electric wire 10, the grommet 40 having a tubular insertion portion 42 through which the sheathless electric wire 30 is inserted, a water stop sheet 50 sandwiched between an inner peripheral surface of the insertion portion 42 and the sheathless electric wire 30 (the braided conductor 20), and a fixture 60 (a tie band or the like) attached to the insertion portion 42 so as to reduce a diameter of the insertion portion 42. Hereinafter, the configuration of each component constituting the wire harness 1 will be described in order.

Figure 2:
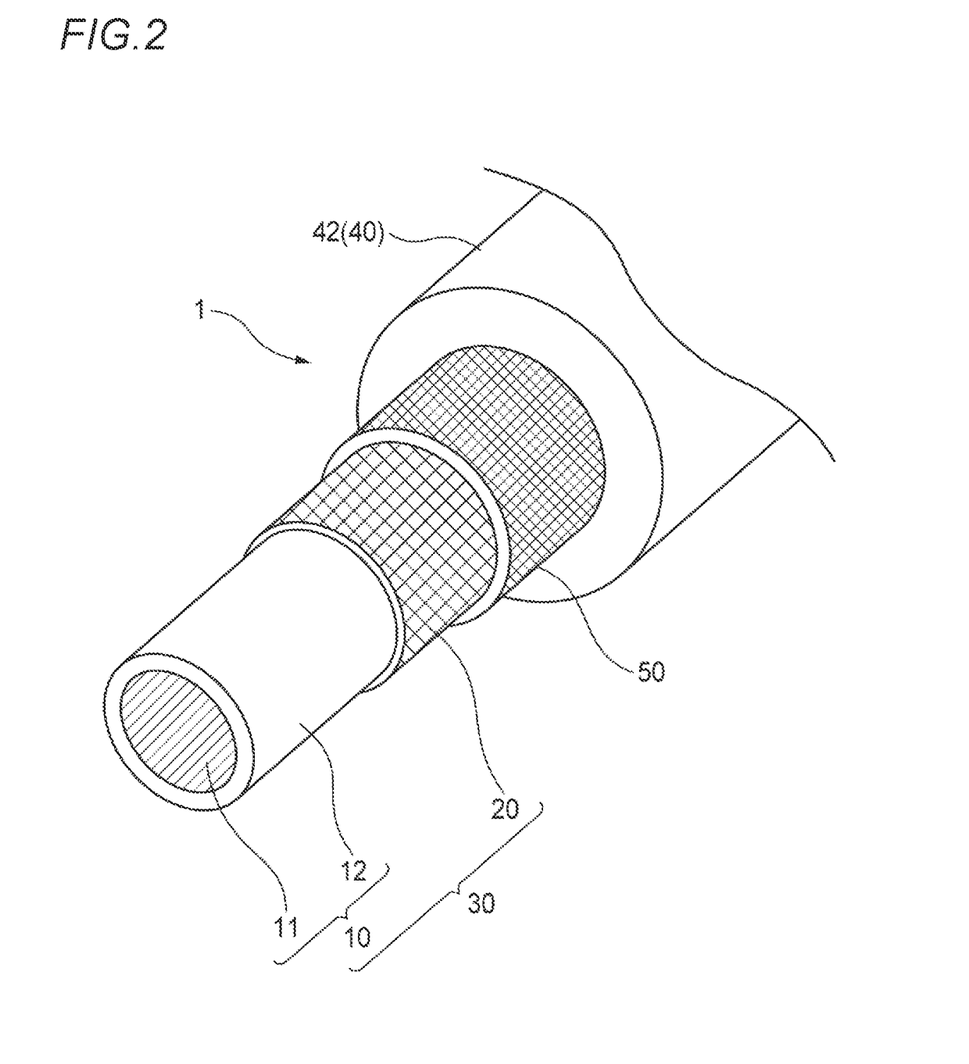
FIG. 2 is a perspective view showing each member extending from an insertion portion of the grommet in an exposed manner in order to illustrate each member constituting the wire harness shown in FIG. 1.
Figure 4A:
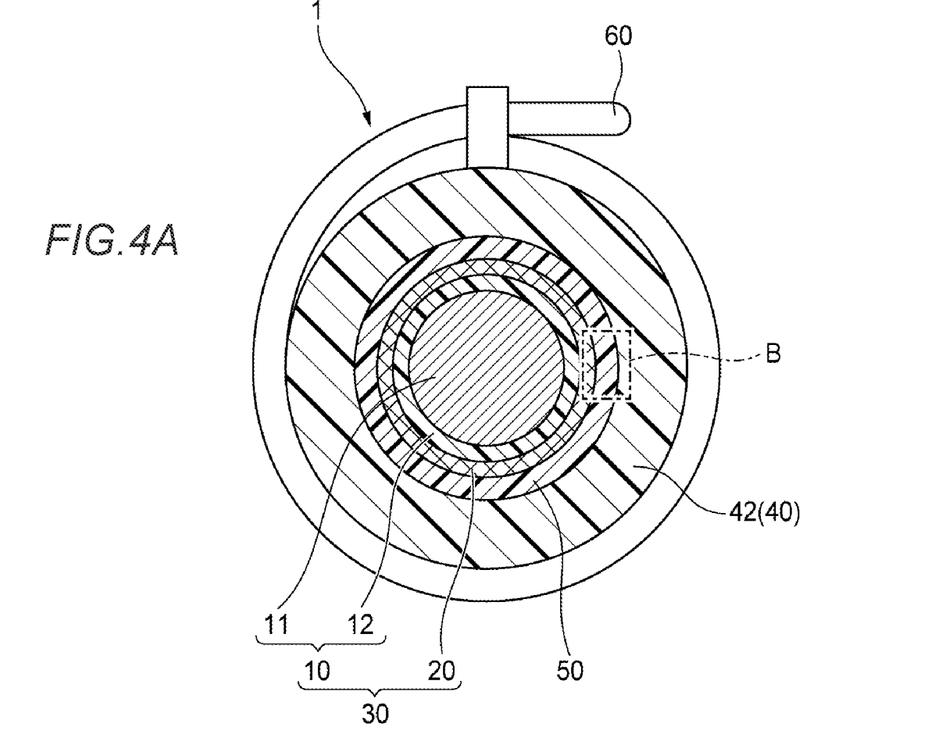
FIG. 4A is a sectional view taken along a line A-A in FIG. 1.
Figure 4B:
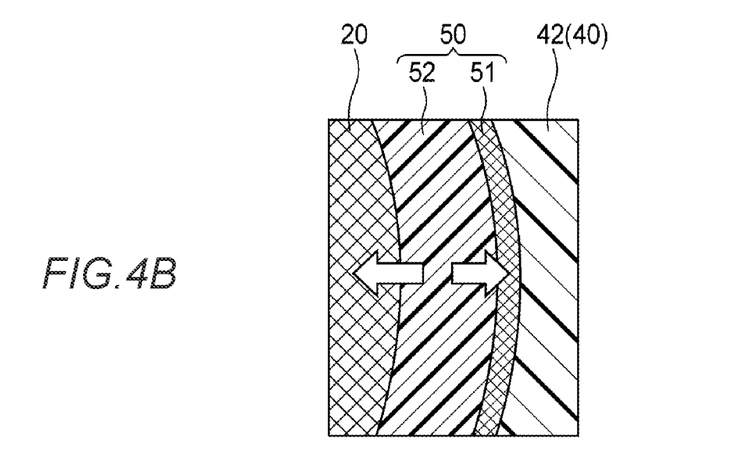
FIG. 4B is an enlarged view of part B in FIG. 4A.

First, the sheathless electric wire 30 will be described. In the present embodiment, as shown in FIG. 2 and FIGS. 4A, 4B, the electric wire 10 constituting the sheathless electric wire 30 is formed of a round bar-shaped conductor 11 and a cylindrical resin coating 12 covering the conductor 11. The braided conductor 20 constituting the sheathless electric wire 30 is arranged in a cylindrical shape on an outer periphery of the coating 12 so as to surround the cylindrical coating 12. The conductor 11 and the braided conductor 20 are typically made of copper or a copper alloy. The sheathless electric wire 30 has a structure in which a sheath covering the braided conductor 20 is not provided (sheathless). In this way, the sheath is not provided, and therefore, the manufacturing cost can be reduced as compared with a mode in which the sheath is provided.

Next, the grommet 40 will be described. As shown in FIG. 1, the grommet 40 integrally includes a body portion 41 having a shape corresponding to the shape of the opening so as to close the opening of the panel P, and the tubular insertion portion 42 through which the sheathless electric wire 30 is inserted. The grommet 40 is typically made of an elastic material such as rubber. An annular fitting portion 41a is formed on an outer peripheral side surface of the body portion 41. The fitting portion 41a is fitted to an opening edge of the panel P, so that the grommet 40 is attached to the panel P with an annular gap between the opening edge and the fitting portion 41a being closed over the entire circumference to exert a water stopping function.

Next, the water stop sheet 50 will be described. The water stop sheet 50 is interposed between the inner peripheral surface of the insertion portion 42 of the grommet 40 and an outer peripheral surface of the sheathless electric wire 30 (that is, the braided conductor 20), and functions to stop water by closing an annular gap between the inner peripheral surface of the insertion portion 42 and the outer peripheral surface of the sheathless electric wire 30 over the entire circumference.

Figure 3A:
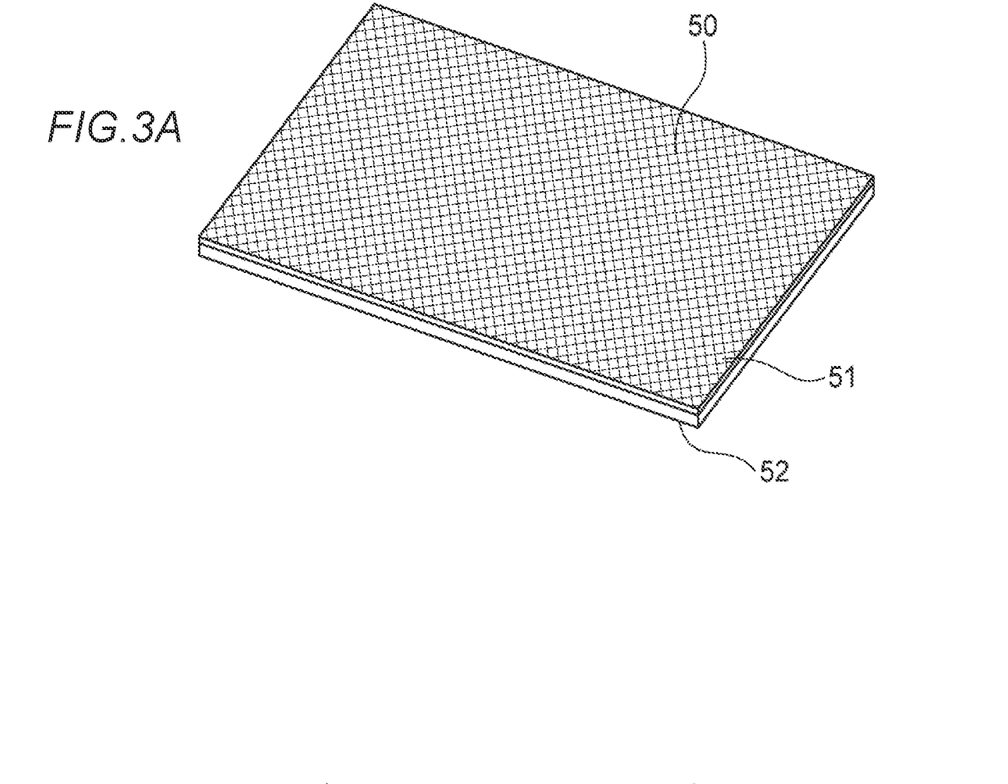
FIG. 3A is a perspective view showing a water stop sheet spread out in a plane.
Figure 3B:
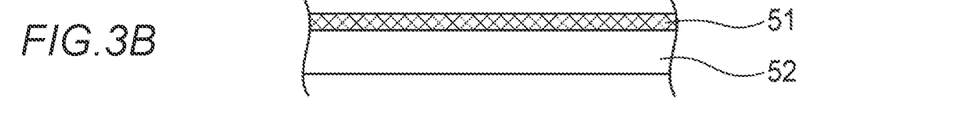
FIG. 3B is a side view showing a part of a side face of the water stop sheet in an enlarged manner.

In the present embodiment, as shown in FIG. 3A, the water stop sheet 50 has a rectangular shape in a state of being spread out in a plane. As shown in FIG. 3B, the water stop sheet 50 has a two-layer structure in which a base material layer 51 and a sealing compound layer 52 are laminated. In the present embodiment, the base material layer 51 is formed of fine mesh wires made of polyester, and is a mesh material having a high flexibility. That is, a large number of pores communicating with each other in a thickness direction are formed in the base material layer 51.

In the present embodiment, the sealing compound layer 52 contains butyl rubber with excellent weather resistance (particularly cold resistance) and self-bonding property (adhesiveness), and is made of a rubber material that can be easily deformed by applying an external force. The sealing compound layer 52 is laminated on the base material layer 51 by, for example, applying a compound for the sealing compound layer 52 in a layer on the base material layer 51.

As an example, the sealing compound layer 52 may contain 50% by weight or more of a filler having at least one of aluminum hydroxide and talc, and 5 to 20% by weight of rubber component including butyl rubber. The sealing compound layer 52 may contain a tackifier, carbon black, a hardness adjusting agent (oil) or the like as other components. Further, the sealing compound layer 52 can be applied on the base material layer 51 so as to have a layer thickness of 100 to 100 g/m².

The sealing compound layer 52 is interposed between the inner peripheral surface of the insertion portion 42 and the outer peripheral surface of the sheathless electric wire 30 (that is, the braided conductor 20) in a cylindrical shape such that the base material layer 51 is positioned radially outside the sealing compound layer 52 (see FIG. 4B).

Next, the fixture 60 will be described. The fixture 60 is a member for winding around an outer peripheral surface of the insertion portion 42 of the grommet 40 and tightening the insertion portion 42 so as to reduce the diameter thereof. In the present embodiment, a binding band is used as the fixture 60. However, a member other than the binding band may be used as the fixture 60 as long as the member exhibits a function of winding around the outer peripheral surface of the insertion portion 42 of the grommet 40 and tightening the insertion portion 42 so as to reduce the diameter thereof. The configuration of each component constituting the wire harness 1 is described above.

Next, as shown in FIG. 1, the work of attaching the wire harness 1 to the panel P will be described. First, the sheathless electric wire 30, the grommet 40, the water stop sheet 50, and the fixture 60 are prepared. Next, the grommet 40 is attached to the panel P by fitting the fitting portion 41a of the body portion 41 of the grommet 40 to the opening edge of the panel P (see FIG. 1).

The water stop sheet 50 is wound in a tubular shape so that the base material layer 51 is positioned radially outside and the water stop sheet 50 is in close contact with the outer peripheral surface of the sheathless electric wire 30 (that is, the braided conductor 20). At this time, it is preferable to overlap peripheral ends of the water stop sheet 50 in a circumferential direction. The water stop sheet 50 wound around the sheathless electric wire 30 is maintained in a state of being wound around the sheathless electric wire 30 due to the self-bonding property of the sealing compound layer 52. The order of attaching the grommet 40 to the panel P and winding the water stop sheet 50 around the sheathless electric wire 30 is not particularly limited. Since the sealing compound layer 52 is integrated with the base material layer 51, it is possible to prevent the sealing compound layer 52 from adhering to the hands of an operator or the like as compared with the case where the sealing compound layer 52 is used alone. As a result, the workability of the winding work of the water stop sheet 50 is remarkably improved.

Next, the sheathless electric wire 30 around which the water stop sheet 50 is wound is inserted into the insertion portion 42 of the grommet 40. Specifically, first, the sheathless electric wire 30 is inserted into the insertion portion 42 in a state where the insertion portion 42 is elastically deformed and expanded in diameter by using a predetermined switch (not shown). At this time, since the sealing compound layer 52 of the water stop sheet 50 wound around the sheathless electric wire 30 is covered with the base material layer 51 (the base material layer 51 is exposed to the outside), it is possible to prevent the sealing compound layer 52 from unintentionally adhering to the hands of an operator or surrounding members (the switch, the inner peripheral surface of the insertion portion 42, or the like) as compared with the case where the sealing compound layer 52 is exposed to the outside.

After the sheathless electric wire 30 is inserted into the insertion portion 42, the switch is removed from the insertion portion 42 to elastically restore the insertion portion 42 (reduce the diameter). As a result, the inner peripheral surface of the insertion portion 42 comes into close contact with the base material layer 51 of the water stop sheet 50 wound around the sheathless electric wire 30. As a result, the water stop sheet 50 is sandwiched between an outer peripheral surface of the braided conductor 20 of the sheathless electric wire 30 and the inner peripheral surface of the insertion portion 42 of the grommet 40, the sealing compound layer 52 is in close contact with the braided conductor 20, and the base material layer 51 is in close contact with the inner peripheral surface of the insertion portion 42.

Next, the fixture 60 is wound around the outer peripheral surface of the insertion portion 42 of the grommet 40, and the insertion portion 42 is tightened so as to reduce the diameter with a predetermined tightening torque. As a result, the sealing compound layer 52 of the water stop sheet 50 is deformed so as to fill the gaps between thin conductor wires constituting the braided conductor 20 and the pores of the base material layer 51 of the water stop sheet 50 (see white arrows in FIG. 4). As a result, water or the like is prevented from passing the insertion portion 42 through the braided conductor 20. Further, since the sealing compound layer 52 can be extruded through the pores of the base material layer 51 toward the inner peripheral surface of the braided conductor 42, water or the like is also prevented from passing the insertion portion 42 through between the water stop sheet 50 and the inner peripheral surface of the insertion portion 42. As described above, the wire harness 1 is completed, and the work of attaching the wire harness 1 to the panel P is completed.

<Functions and Effects>

According to the wire harness 1 of the present embodiment, the diameter of the insertion portion 42 is reduced by the fixture 60 with the water stop sheet 50 being sandwiched between the braided conductor 20 that covers the electric wire 10 (the sheathless electric wire 30) and the inner peripheral surface of the insertion portion 42 of the grommet 40. At this time, the adhesive sealing compound layer 52 of the water stop sheet 50 is deformed so as to fill the gaps between the thin conductor wires constituting the braided conductor 20 and the pores of the base material layer 51 of the water stop sheet 50. As a result, water or the like is prevented from passing the insertion portion 42 through the braided conductor 20. Further, since the water stop sheet 50 has the base material layer 51, the water stop sheet 50 can be easily handled as compared with the case where the water stop sheet 50 is formed of only the sealing compound layer 52. Further, since the sealing compound layer 52 can be extruded through the pores of the base material layer 51 toward the inner peripheral surface of the braided conductor 42, water or the like is also prevented from passing the insertion portion through between the water stop sheet 50 and the inner peripheral surface of the insertion portion 42. Therefore, the wire harness 1 according to the present embodiment can improve the water stopping property at the insertion portion 42 of the grommet 40.

Further, according to the wire harness 1 of the present embodiment, by using the sealing compound layer 52 having a rubber component containing butyl rubber with excellent weather resistance (particularly cold resistance) and self-bonding property, the water stopping property of the insertion portion 42 of the grommet 40 can be appropriately maintained for a long period of time. Further, by using a mesh material formed of fine mesh wires for the base material layer 51, the flexibility of the water stop sheet 50 can be improved. The sealing compound layer 52 is laminated on the base material layer 51, so that it is possible to prevent the sealing compound layer 52 from unintentionally adhering to the hands of an operator or surrounding members, and the water stop sheet 50 can be easily handled. Therefore, the workability of work such as winding the water stop sheet 50 around the braided conductor 20 of the sheathless electric wire 30 can be improved.

Other Embodiments

The present invention is not limited to the above embodiment and various modifications can be adopted within the scope of the present invention. For example, the present invention is not limited to the embodiment described above, and may be appropriately modified, improved or the like. In addition, the material, shape, size, number, arrangement position or the like of each component in the above-described embodiment are optional and are not limited as long as the present invention can be achieved.

Figure 5:
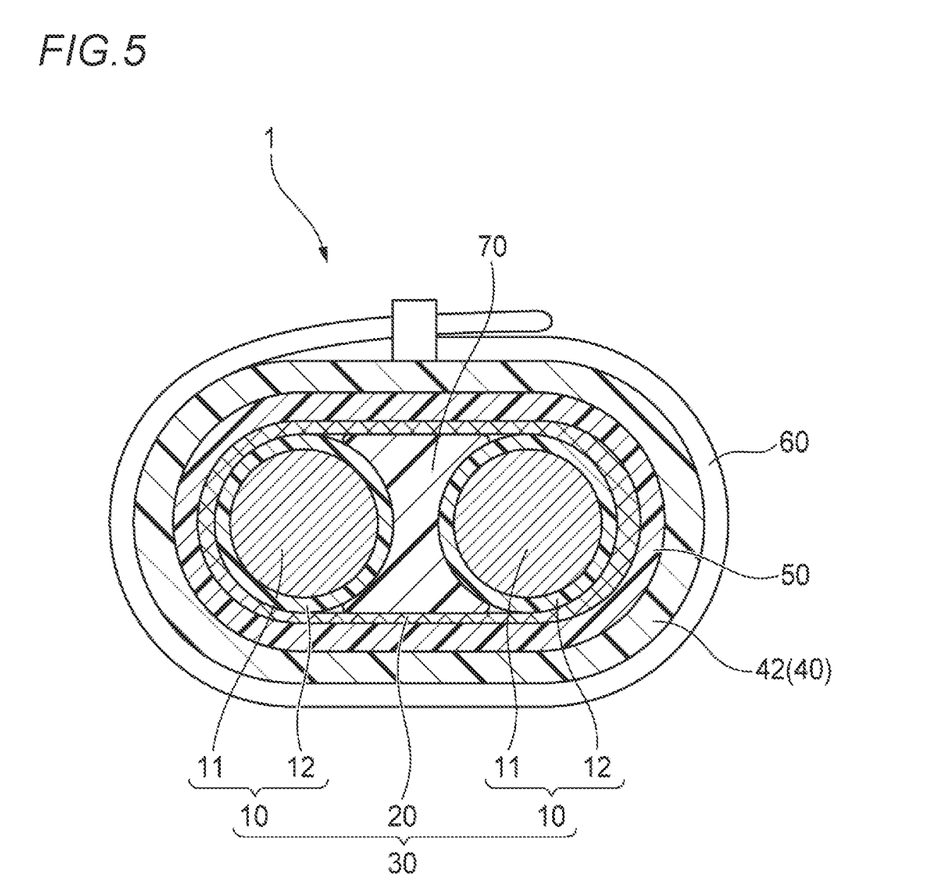
FIG. 5 is a sectional view corresponding to FIG. 4A according to a modification.

For example, in the above embodiment, the sheathless electric wire 30 in which the braided conductor 20 covers the outer periphery of one electric wire 10 is used (see FIG. 4A). On the other hand, as shown in FIG. 5, a sheathless electric wire 30 in which the braided conductor 20 collectively covers the outer periphery of a plurality of (two in FIG. 5) electric wires 10 may be used. In this case, as shown in FIG. 5, it is preferable that an inter-wire water stop material 70 is provided to fill a gap between the plurality of electric wires 10, and the braided conductor 20 collectively covers the plurality of electric wires 10 and the inter-wire water stop material 70. As a result, water or the like can be prevented from entering through the gap between the plurality of electric wires 10. The inter-wire water stop material 70 may be made of, for example, ethylene propylene diene monomer (EPDM).

Further, in the above embodiment, the sealing compound layer 52 is arranged so that the base material layer 51 is positioned radially outside the sealing compound layer 52. However, conversely, the sealing compound layer 52 may be arranged so that the base material layer 51 is positioned radially inside the sealing compound layer 52.

Here, characteristics of the embodiments of the wire harness 1 according to the present invention described above are summarized briefly in the following [1] to [3], respectively.

[1] A wire harness (1) including:
an electric wire (10);
a braided conductor (20) covering the electric wire (10);
a grommet (40) having a tubular insertion portion (42) through which the electric wire (10) and the braided conductor (20) are inserted;
a water stop sheet (50) sandwiched between an inner peripheral surface of the insertion portion (42) and the braided conductor (20); and
a fixture (60) attached to the insertion portion (42) so as to reduce a diameter of the insertion portion (42),
in which the water stop sheet (50) includes a base material layer (51) having a plurality of pores communicating with each other in a thickness direction of the water stop sheet (50) and an adhesive sealing compound layer (52) laminated on the base material layer (51), and the fixture (60) reduces the diameter of the insertion portion (42) such that the sealing compound layer (52) deforms to enter gaps between thin conductor wires constituting the braided conductor (20) and the pores of the base material layer (51).

[2] In the wire harness (1) described in [1],
the sealing compound layer (52) has a rubber component containing butyl rubber, and
the base material layer (51) has a mesh material formed of fine mesh wires.

[3] The wire harness (1) described in [1] or [2] further including:
a plurality of the electric wires (10); and
an inter-wire water stop material (70) filling a gap between the plurality of electric wires (10),
in which the braided conductor (20) collectively covers the plurality of electric wires (10) and the inter-wire water stop material (70).

[4]
A method for manufacturing a wire harness including an electric wire, a braided conductor covering the electric wire, a grommet having a tubular insertion portion through which the electric wire and the braided conductor are inserted, a water stop sheet sandwiched between an inner peripheral surface of the insertion portion and the braided conductor, and a fixture attached to the insertion portion so as to reduce a diameter of the insertion portion, the method including:
preparing the electric wire, the braided conductor, the grommet, the water stop sheet including a base material layer having a plurality of pores communicating with each other in a thickness direction of the water stop sheet and a sealing compound layer laminated on the base material layer, and the fixture;

winding cylindrically the water stop sheet around the electric wire such that the water stop sheet is in close contact with the outer peripheral surface of the electric wire;

inserting the electric wire around which the water stop sheet is wound into an insertion portion of the grommet; and tightening the insertion portion by the fixture so as to reduce a diameter of the insertion portion after winding the fixture around an outer peripheral surface of the insertion portion in a state that the water stop sheet is sandwiched between an inner peripheral surface of the insertion portion and the braided conductor.

In the tightening, the sealing compound layer deforms to enter gaps between thin conductor wires constituting the braided conductor and the pores of the base material layer.

According to the wire harness having the configuration of [1] or [4], the diameter of the insertion portion is reduced by the fixture with the water stop sheet being sandwiched between the braided conductor that covers the electric wire and the inner peripheral surface of the insertion portion of the grommet. At this time, the sealing compound layer of the water stop sheet is deformed so as to enter the gaps between the thin conductor wires constituting the braided conductor and the pores of the base material layer of the water stop sheet, and fill the gaps and pores. As a result, water or the like is properly prevented from passing the insertion portion through the braided conductor as compared with the case where the water stop sheet is not provided. Further, since the water stop sheet has the base material layer, the water stop sheet can be easily handled as compared with the case where the water stop sheet is formed of only the sealing compound layer. Further, since the sealing compound layer can be extruded to a back side of the base material layer through the pores of the base material layer, the same water stopping effect as described above can be exhibited on a surface of the water stop sheet on the side where the sealing compound layer is not exposed. Therefore, for example, when the water stop sheet is arranged such that the sealing compound layer faces the braided conductor and the base material layer faces the inner peripheral surface of the insertion portion, not only is water intrusion through the braided conductor prevented, but water intrusion through between the base material layer and the inner peripheral surface of the insertion portion is also prevented. As described above, the water stopping property at the insertion portion of the grommet can be improved in the wire harness having this configuration.

According to the wire harness having the configuration of [2], by using the sealing compound layer having a rubber component containing butyl rubber with excellent weather resistance (particularly cold resistance) and self-bonding property, the water stopping property of the insertion portion of the grommet can be improved, and the water stopping property can be appropriately maintained for a long period of time. Further, by using a mesh material formed of fine mesh wires for the base material layer, when the diameter of the insertion portion of the grommet is reduced, the sealing compound layer can be easily extruded to the back side of the mesh material through the gaps in the mesh material. In addition, the flexibility of the sealing compound layer is not impaired. Further, it is possible to prevent the sealing compound layer from unintentionally adhering to the hands of an operator or surrounding members, and the water stop sheet can be easily handled. Therefore, the workability of work such as winding the water stop sheet around the electric wire and the braided conductor can be improved.

According to the wire harness having the configuration of [3], even in a case where a plurality of electric wires are used, water or the like can be prevented from entering through the gap between the plurality of electric wires by using the inter-wire water stop material.

According to the present invention, it is possible to provide a wire harness in which water stopping property at an insertion portion of a grommet is improved.

What is claimed is:

1. A wire harness comprising:
   an electric wire;
   a braided conductor covering the electric wire;
   a grommet having a tubular insertion portion through which the electric wire and the braided conductor are inserted;
   a water stop sheet sandwiched between an inner peripheral surface of the insertion portion and the braided conductor; and
   a fixture attached to the insertion portion so as to reduce a diameter of the insertion portion,
   wherein the water stop sheet includes a base material layer having a plurality of pores communicating with each other in a thickness direction of the water stop sheet and a sealing compound layer laminated on the base material layer, and the fixture reduces the diameter of the insertion portion such that the sealing compound layer deforms to enter gaps between thin conductor wires constituting the braided conductor and the pores of the base material layer.

2. The wire harness according to claim 1,
   wherein the sealing compound layer has a rubber component containing butyl rubber, and
   wherein the base material layer has a mesh material formed of fine mesh wires.

3. The wire harness according to claim 1, further comprising:
   a plurality of the electric wires; and
   an inter-wire water stop material filling a gap between the plurality of electric wires,
   wherein the braided conductor collectively covers the plurality of electric wires and the inter-wire water stop material.

4. A method for manufacturing a wire harness including an electric wire, a braided conductor covering the electric wire, a grommet having a tubular insertion portion through which the electric wire and the braided conductor are inserted, a water stop sheet sandwiched between an inner peripheral surface of the insertion portion and the braided conductor, and a fixture attached to the insertion portion so as to reduce a diameter of the insertion portion, the method comprising:
   preparing the electric wire, the braided conductor, the grommet, the water stop sheet including a base material layer having a plurality of pores communicating with each other in a thickness direction of the water stop sheet and a sealing compound layer laminated on the base material layer, and the fixture;
   winding cylindrically the water stop sheet around the electric wire such that the water stop sheet is in close contact with the outer peripheral surface of the electric wire;
   inserting the electric wire around which the water stop sheet is wound into an insertion portion of the grommet; and
   tightening the insertion portion by the fixture so as to reduce a diameter of the insertion portion after winding the fixture around an outer peripheral surface of the insertion portion in a state that the water stop sheet is sandwiched between an inner peripheral surface of the insertion portion and the braided conductor,
wherein in the tightening, the sealing compound layer deforms to enter gaps between thin conductor wires constituting the braided conductor and the pores of the base material layer.

\* \* \* \* \*